US009843611B2

(12) United States Patent
Brewer et al.

(10) Patent No.: US 9,843,611 B2
(45) Date of Patent: *Dec. 12, 2017

(54) INCIDENT DATA COLLECTION FOR PUBLIC PROTECTION AGENCIES

(71) Applicant: International Business Machines Corporation, Armonk, NY (US)

(72) Inventors: Derek R. Brewer, Bowling Green, OH (US); Kerry M. Langford, Rochester, MN (US); Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,565

(22) Filed: Aug. 14, 2015

(65) Prior Publication Data

US 2015/0381942 A1 Dec. 31, 2015

Related U.S. Application Data

(63) Continuation of application No. 14/315,160, filed on Jun. 25, 2014.

(51) Int. Cl.
*H04L 29/06* (2006.01)
*H04L 29/08* (2006.01)
(Continued)

(52) U.S. Cl.
CPC ........ *H04L 65/403* (2013.01); *G06F 17/3087* (2013.01); *G06F 17/30876* (2013.01);
(Continued)

(58) Field of Classification Search
CPC ........... G06F 17/3087; G06F 17/30876; G08B 13/196; H04L 63/302; H04L 65/403; H04N 7/181
See application file for complete search history.

(56) References Cited

U.S. PATENT DOCUMENTS 6,600,812 B1 * 7/2003 Gentillin ............... G06F 19/322
379/45
6,950,013 B2 9/2005 Scaman et al.
(Continued)

FOREIGN PATENT DOCUMENTS

JP 2002199117 7/2002
WO WO 2015195231 A1 * 12/2015 .............. H04W 4/22

OTHER PUBLICATIONS

ERB et al "diretto: A Toolkit for Distributed Reporting and Collaboration," Mensch & Computer 2011, Sep. 2011, 10 pages.
(Continued)

*Primary Examiner* — Uzma Alam
(74) *Attorney, Agent, or Firm* — Van Leeuwen & Van Leeuwen; Damion C. Josephs

(57) ABSTRACT

An approach is provided in which a public protection system sends a data collection request to user devices located within a geographical proximity of an incident in progress that instructs the user devices to capture real-time data corresponding to the incident in progress. The public protection system receives the real-time data from the user devices and determines that a set of the real-time data includes evidence data corresponding to the incident in progress.

7 Claims, 12 Drawing Sheets

(51) Int. Cl.
*G06F 17/30* (2006.01)
*G08B 27/00* (2006.01)
*H04N 7/18* (2006.01)
*H04W 4/00* (2009.01)

(52) U.S. Cl.
CPC ............ *H04L 63/302* (2013.01); *H04L 67/18* (2013.01); *H04L 67/22* (2013.01); *H04N 7/181* (2013.01); *H04W 4/00* (2013.01); *G08B 27/00* (2013.01)

(56) References Cited

U.S. PATENT DOCUMENTS

| | | | | |
|---|---|---|---|---|
| 7,610,113 | B2* | 10/2009 | Cocciadiferro | B29B 7/7663 700/108 |
| 7,840,203 | B2* | 11/2010 | Shin | G08B 13/19621 455/3.06 |
| 7,899,210 | B2 | 3/2011 | Dorai et al. | |
| 8,219,588 | B2 | 7/2012 | Bousquet et al. | |
| 8,502,868 | B2 | 8/2013 | Buehler et al. | |
| 8,606,872 | B1* | 12/2013 | Reitnour | G06F 15/17306 709/203 |
| 8,718,910 | B2* | 5/2014 | Gueziec | G08G 1/0112 701/119 |
| 8,751,528 | B2* | 6/2014 | Huang | G06F 17/30412 707/770 |
| 8,760,290 | B2* | 6/2014 | Piett | G06Q 30/02 340/540 |
| 9,037,108 | B1* | 5/2015 | Delatorre | H04W 4/22 455/404.1 |
| 9,110,988 | B1* | 8/2015 | Tan | G06F 17/30784 |
| 2001/0005217 | A1* | 6/2001 | Hamilton | B60R 11/04 348/148 |
| 2002/0095490 | A1* | 7/2002 | Barker | H04L 29/06 709/224 |
| 2003/0064712 | A1* | 4/2003 | Gaston | H04W 88/06 463/40 |
| 2003/0163287 | A1* | 8/2003 | Vock | A43B 3/0005 702/187 |
| 2005/0174229 | A1* | 8/2005 | Feldkamp | G08B 13/19656 340/506 |
| 2007/0103294 | A1* | 5/2007 | Bonecutter | G08B 21/10 340/539.18 |
| 2008/0114726 | A1 | 5/2008 | Keohane et al. | |
| 2008/0320159 | A1* | 12/2008 | Naimark | H04N 21/2187 709/231 |
| 2009/0251533 | A1* | 10/2009 | Smith | G06Q 10/00 348/77 |
| 2010/0030786 | A1 | 2/2010 | McConnell | |
| 2010/0064215 | A1* | 3/2010 | Portman | G06F 3/14 715/704 |
| 2011/0007139 | A1* | 1/2011 | Brunetti | G08B 13/19613 348/51 |
| 2011/0018998 | A1* | 1/2011 | Guzik | H04N 21/21 348/143 |
| 2011/0167357 | A1* | 7/2011 | Benjamin | H04M 1/72572 715/753 |
| 2011/0175724 | A1* | 7/2011 | Kent | G06Q 10/06 340/539.13 |
| 2011/0181443 | A1* | 7/2011 | Gutierrez | G01C 21/3691 340/990 |
| 2012/0183230 | A1 | 7/2012 | Lopez et al. | |
| 2012/0233000 | A1* | 9/2012 | Fisher | G06Q 30/02 705/14.71 |
| 2012/0295575 | A1* | 11/2012 | Nam | G08B 25/016 455/404.1 |
| 2012/0322401 | A1* | 12/2012 | Collins | H04W 4/22 455/404.1 |
| 2013/0086109 | A1* | 4/2013 | Huang | G06F 17/30412 707/770 |
| 2013/0106904 | A1* | 5/2013 | Park | G06F 3/04883 345/619 |
| 2013/0321388 | A1* | 12/2013 | Locke | G06F 17/30867 345/418 |
| 2014/0052775 | A1* | 2/2014 | Koo | H04W 8/245 709/203 |
| 2014/0057590 | A1* | 2/2014 | Romero | H04W 4/22 455/404.2 |
| 2014/0146177 | A1* | 5/2014 | Pacor | H04N 21/21805 348/157 |
| 2014/0200963 | A1* | 7/2014 | Abhyanker | G06Q 30/0205 705/7.34 |
| 2014/0285337 | A1* | 9/2014 | Gebhardt | B60R 25/102 340/521 |
| 2015/0170486 | A1* | 6/2015 | Penland | G07C 9/00126 348/152 |
| 2015/0227999 | A1* | 8/2015 | Maguire | G06Q 50/01 705/80 |
| 2015/0248194 | A1* | 9/2015 | Simpson | H04L 67/1097 715/719 |

OTHER PUBLICATIONS

Anonymous, "Image/Video Search from Mobile Devices to Aid Law Enforcement Investigations," IP.com Prior Art Database Disclosure, IP.com Disclosure No. IPCOM000213438D, Dec. 14, 2011, 3 pages.

Brewer et al., "Incident Data Collection for Public Protection Agencies," U.S. Appl. No. 14/315,160, filed Jun. 25, 2014, 43 pages.

"List of IBM Patents or Patent Applications Treated as Related," Letter from Leslie A. Van Leeuwen, dated Aug. 14, 2015, 1 page.

* cited by examiner

300 

| Incident Type | Request Type | Requested Action | |
|---|---|---|---|
| Incident In-Progress | Real-Time Data Collection Request | Collect Real-Time Data and Provide/Stream to PPS | 310 |
| | Tracking Request | Track an Object or Pan User Device a Particular Direction | 320 |
| | Contact Information Request | Provide Contact Information of User | 330 |
| Post-Incident | Data Analysis Request | Analyze Stored Data Based Upon Incident Information and Provide to PPS | 340 |
| | Contact Information Request | Provide Contact Information of User | 350 |

*FIG. 3*

INCIDENT DATA COLLECTION FOR PUBLIC PROTECTION AGENCIES

BACKGROUND

The present disclosure relates to a public protection system identifying user devices in proximity to an incident and collecting real-time data from the identified devices.

Today's public protection agencies constantly struggle with citizens reporting incorrect information and tips pertaining to an incident. The incorrect information wastes valuable public protection agencies' time and resources, and may also hinder the investigation of the incident. In addition, the public protection agencies may respond to an incident in progress assuming the reported information is correct, only to discover that the incident is much different from originally reported.

In contrast, when a public protection agency receives timely and accurate information, the public protection agency is much more prepared to resolve the incident. For example, if a law enforcement agency receives a correct license plate number of a thief's vehicle immediately following a bank robbery, the law enforcement agency has a higher probability of apprehending the thief.

BRIEF SUMMARY

According to one embodiment of the present disclosure, an approach is provided in which a public protection system sends a data collection request to user devices located within a geographical proximity of an incident in progress that instructs the user devices to capture real-time data corresponding to the incident in progress. The public protection system receives the real-time data from the user devices and determines that a set of the real-time data includes evidence data corresponding to the incident in progress.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 3 is a diagram depicting an example of a table that includes incident types, request types, and requested actions;

DETAILED DESCRIPTION

Figure 1:
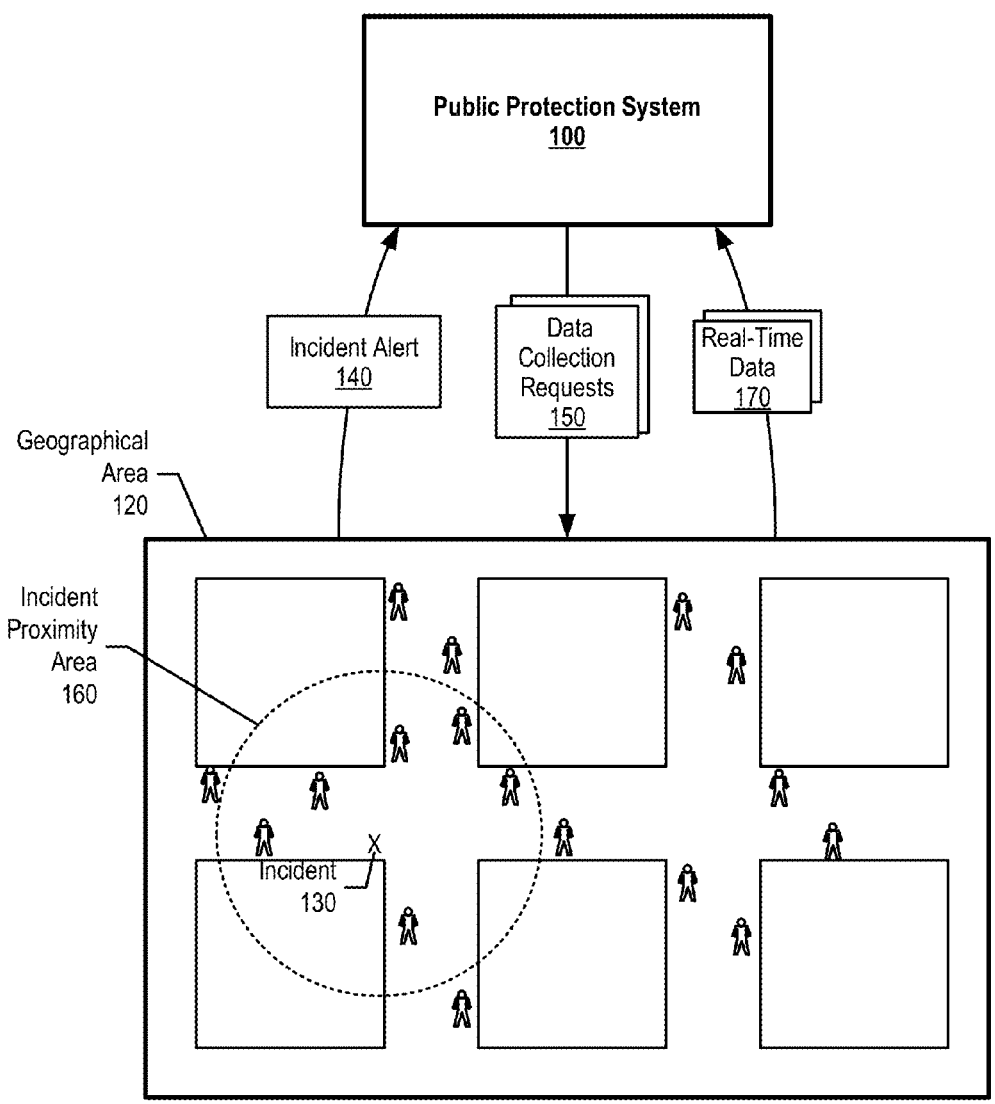
FIG. 1 is a diagram depicting an example of a public protection system receiving an incident alert and requesting real-time data from user devices in proximity to the incident in progress.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 is a diagram depicting an example of a public protection system receiving an incident alert and requesting real-time data from user devices in proximity to the incident in progress. Public protection system 100 supports agencies such as law enforcement, fire departments, emergency medical services (EMS), etc., and receives incident alert 140 corresponding to incident 130 within geographical area 120. For example, public protection system 100 may be a 911-call center that supports incidents that occur within a city.

Incident alert 140 includes information corresponding to an incident in progress, such as a bank robbery, a building on fire, a person having a heart attack, etc. The information includes a geographical location of incident 130, such a street address or GPS coordinates. Public protection system 100, in turn, determines incident proximity area 160 around incident 130 and identifies user devices within incident proximity area 160. In one embodiment, public protection system 100 uses phone tracking technology to identify devices located within incident proximity area 160. The example in FIG. 1 shows that six citizens are located within geographical area 160, each of which having a corresponding a user device (e.g., smart phone).

Public protection system 100 sends data collection requests 150 to the proximate devices to collect real-time data pertinent to incident 130. For example, data collection requests 150 may include a request for the citizens to video a fire in progress so the fire department is aware of the severity of the fire prior to arriving at the scene.

Public protection system 100 receives real-time data 170 from the proximate devices, which public protection system 100 analyzes for evidence data. For example, a burglary may be in progress and a device may provide an image of the burglar's vehicle. In turn, public protection system 100 may send additional requests to the user devices based upon analyzing real-time data 170, such as videotaping a vehicle as it leaves the scene of incident 130 (see FIG. 2 and corresponding text for further details).

In one embodiment, public protection system 100 periodically provides unsolved incident data to registered devices to receive the unsolved incident data. For example, a law enforcement agency may implement a program that encourages citizens to download license plate data of stolen vehicles over the past six months in exchange for a reward when the user's device matches data stored on the user's device with the unsolved incident data. In this embodiment, the device alerts the user and the user may view the data prior to sending the data to the public protection system (see FIGS. 6, 10, and corresponding text for further details).

Figure 2:
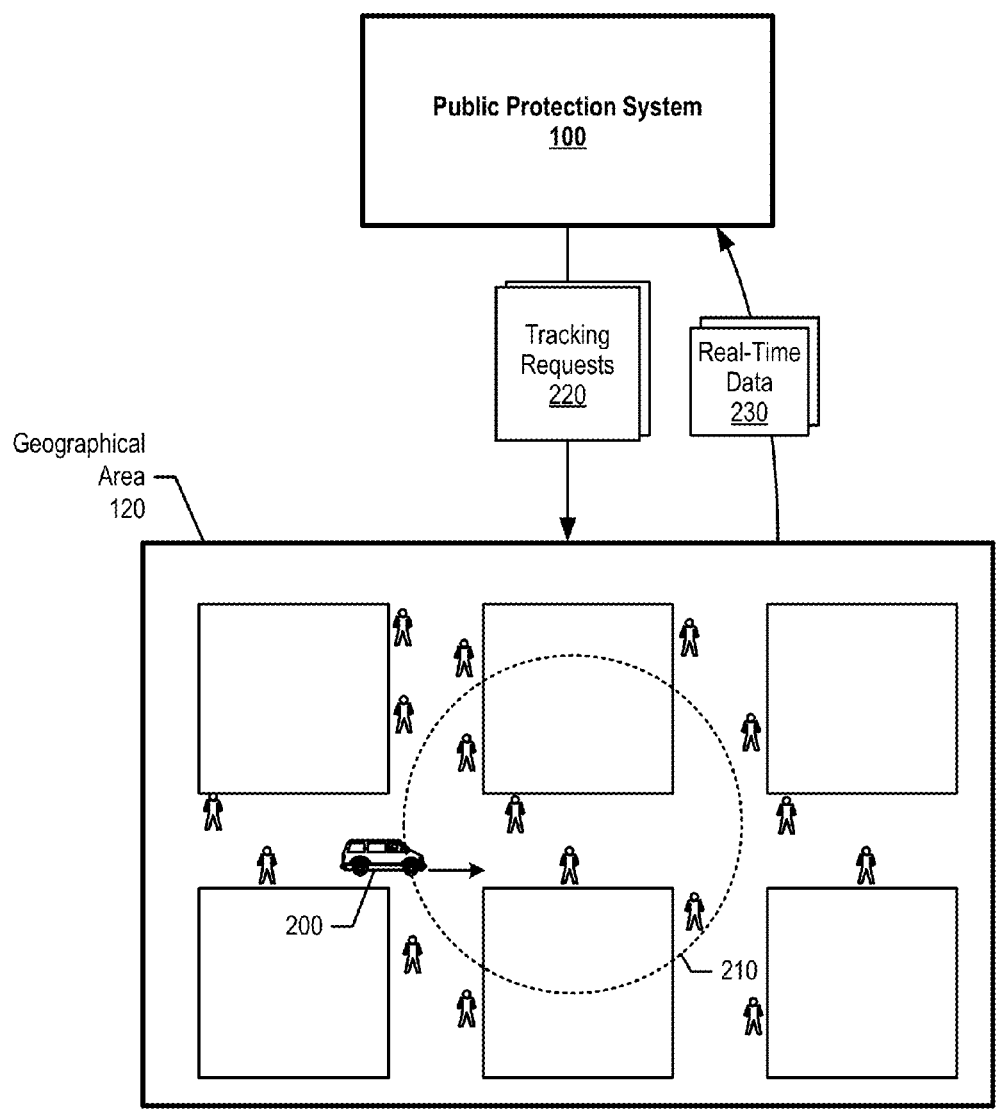
FIG. 2 is a diagram depicting an example of a public protection system sending tracking requests to devices in proximity to an incident in progress.

FIG. 2 is a diagram depicting an example of a public protection system sending tracking requests to devices in proximity to an incident in progress. Referring to FIG. 1, public protection system 100 received real-time data 170 from devices in proximity to incident 130. In turn, public protection system 100 determined that a suspect is using vehicle 200 to leave the scene of incident 130.

Public protection system 100 identifies area 210, which is in a direction that vehicle 200 is traveling, and identifies devices within area 210 that may provide real-time data, such as video of vehicle 200 and whether vehicle 200 turns onto a different street. Public protection system 100 sends tracking requests 220 to devices within area 210, which may include specific information such as "track blue van traveling East on Main Street" (see FIG. 4 and corresponding text for further details). In turn, public protection system 100 receives real-time data 230 from the user devices in response to the user devices performing the actions requested by public protection system 100. In one embodiment, public protection system 100 offers a reward for the users of the devices to perform the requested actions.

FIG. 3 is a diagram depicting an example of a table that includes incident types, request types, and requested actions. Table 300 shows examples of incident types managed by the public protection system, such as incidents in progress and post-incidents. Incidents in progress may be, for example, a bank robbery in progress, suspects in pursuit, a building on fire, a sinking boat, an altercation between people, or other events that are ongoing at the time that the public protection system receives an incident alert.

Post-incidents correspond to events that have completed at the time the public protection system receives the incident alert, such as a house robbery that occurred while the homeowners were on vacation. Post-incidents may also include unsolved incidents. For example, the public protection system may periodically download unsolved incident data to user devices, such as stolen vehicle information of unrecovered vehicles. In this example, the user devices periodically compare captured data with the unsolved incident data to determine whether the user device captured evidence data pertaining to an unsolved event (see FIG. 10 and corresponding text for further details).

Line 310 corresponds to a real-time data collection request that requests a user device to collect real-time data in proximity to an incident in progress, such as still images, video, audio, etc. (see FIG. 1 and corresponding text for further details). Line 320 corresponds to a tracking request that requests a user to perform particular actions, such as videotape a vehicle leaving the scene of a crime (see FIG. 4 and corresponding text for further details). Line 330 corresponds to a contact information requests that requests contact information of a user that captured evidence data pertaining to an incident, such as the user's name and phone number.

Regarding post-incident requests, line 340 corresponds to a data analysis request that requests the user device to analyze stored data against incident data. For example, a vehicle may have been stolen seven days ago and the public protection system may request a user device to search stored images taken within a particular time frame in a particular geographical area for matching vehicles. In one embodiment, the user device periodically receives unsolved incident data and compares captured media against the unsolved incident data (see FIG. 10 and corresponding text for further details). Line 350 corresponds to a contact information requests that requests contact information of a user that captured evidence data pertaining to an incident, such as the user's name and phone number.

Figure 4:
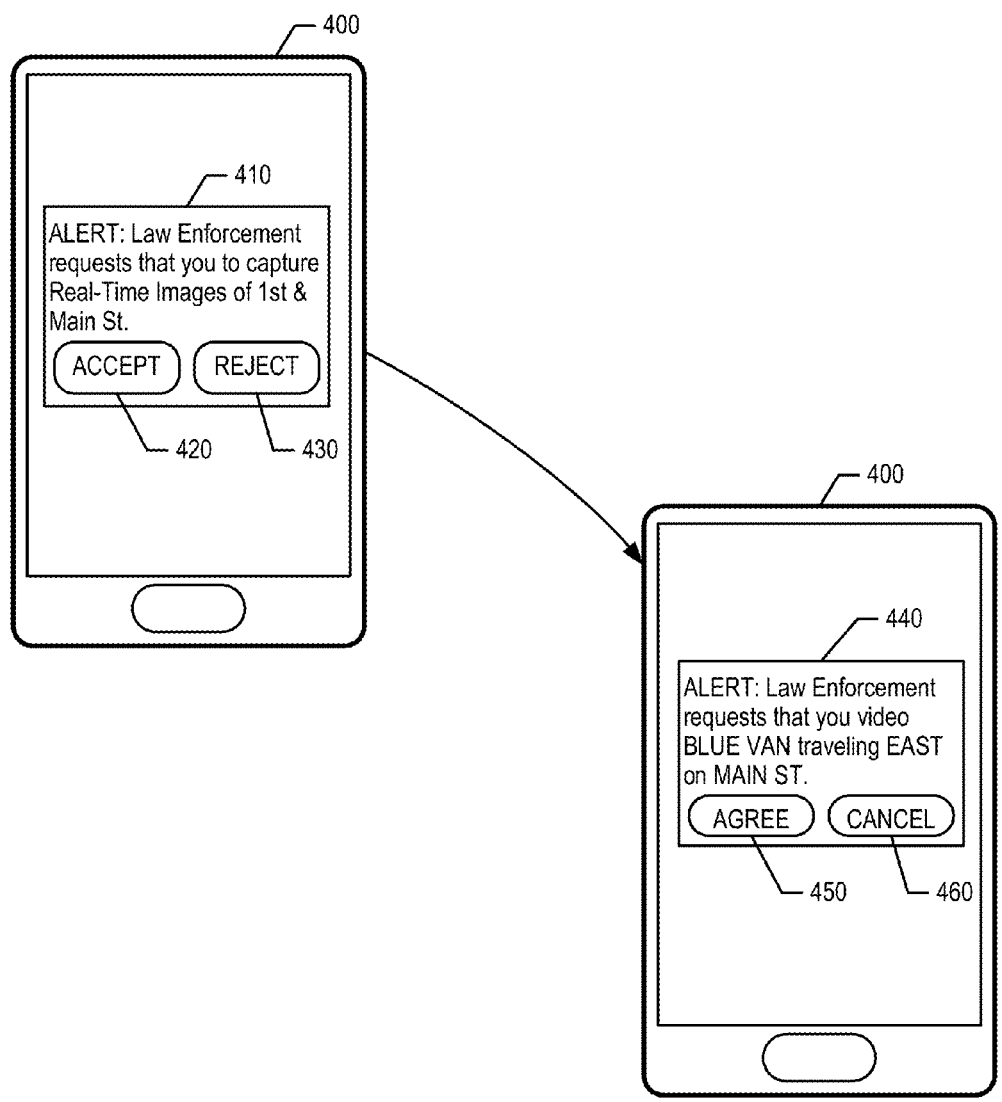
FIG. 4 is a diagram depicting an example of a user device displaying messages to a user pertaining to an incident in progress.

FIG. 4 is a diagram depicting an example of a user device displaying messages to a user pertaining to an incident in progress. User device 400 is located within an incident proximity area corresponding to an incident in progress (e.g., bank robbery). As such, the public protection system sends a real-time data collection request to user device 400. User device 400 displays message 410 to the user, which requests the user to capture real-time images (or video) of the intersection of $1^{st}$ Street and Main Street, which is the location of the incident in progress. The user selects accept 420 to participate in the image collection, or selects reject 430 to reject the request.

When the user selects accept 420, the user device opens an image capture application and the user points the device towards $1^{st}$ Street and Main Street. The user device uploads the images to the public protection system and, when the public protection system determines that the images include evidence data, the public protection system sends a tracking request to user device 400, which is displayed as message 440. For example, the user device may have uploaded an image of a blue van that is suspect. The example in FIG. 4 shows that the public protection system is requesting the user to capture video of a blue van traveling East on Main Street (see FIG. 2 and corresponding text for further details). The user selects agree 450 to assist in the evidence collection, or selects cancel 460 if the user does not wish to collect additional data. In one embodiment, user device 400 may display a reward message that indicates a monetary reward if the user assists in the data collection.

Figure 5:
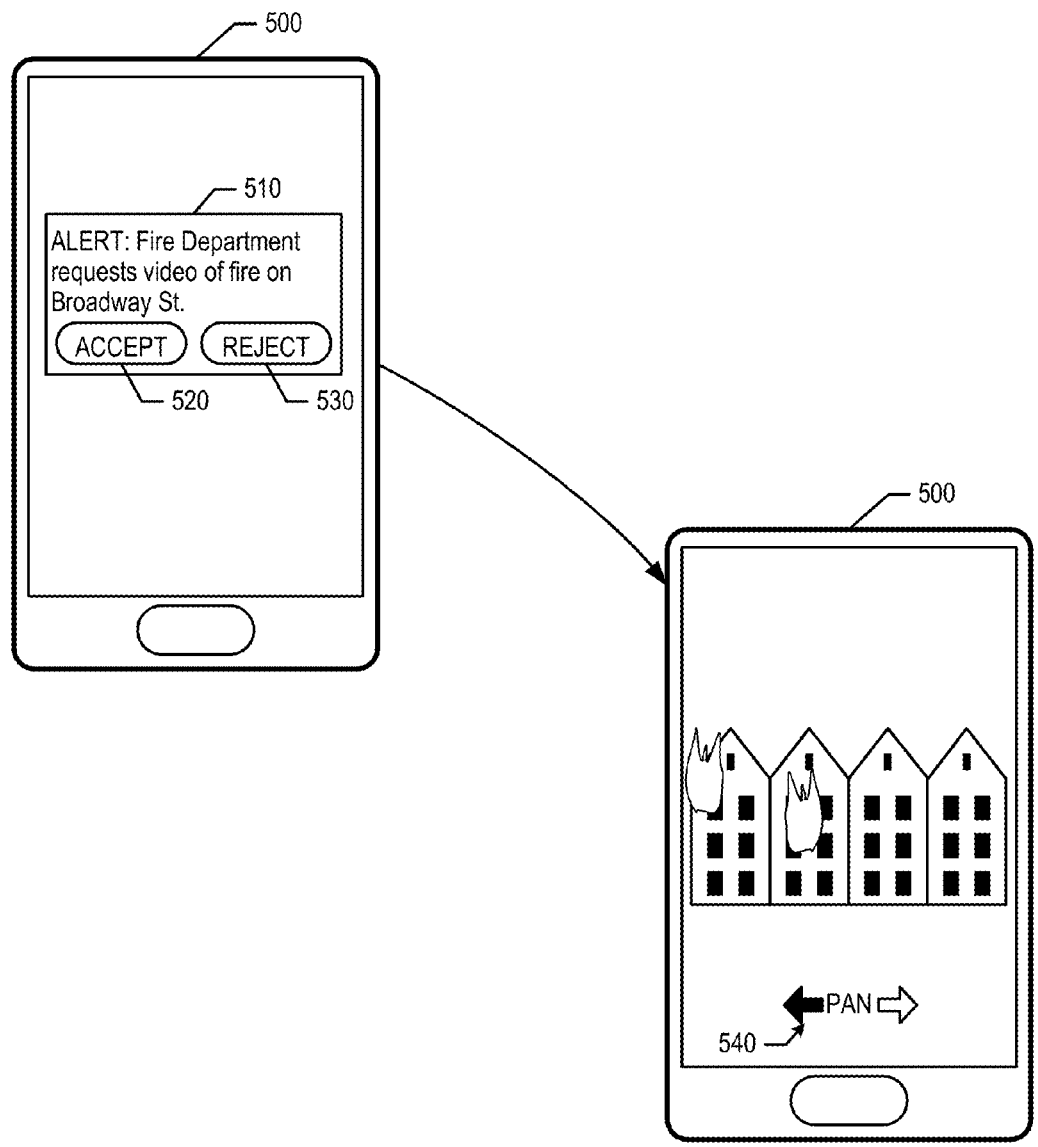
FIG. 5 is a diagram depicting an example of a user device displaying messages to a user pertaining to a fire in progress.

FIG. 5 is a diagram depicting an example of a user device displaying messages to a user pertaining to a fire in progress. User device 500 is located within an incident proximity area of an apartment fire. As such, the public protection system sends a real-time data collection request to user device 500, whereupon user device 500 displays message 510 to the user requesting the user to capture real-time video of the fire on Broadway Street. The user selects accept 520 to partake in the video collection, or selects reject 530 to reject the request.

When the user selects accept 520, the user device opens an image capture application and the user points the device towards the apartment fire. In one embodiment, the user device streams the video to the public protection system and allows the public protection system to send tracking requests back to the user device accordingly. FIG. 5 shows that the public protection system highlighted arrow 540 to inform the user to pan to the left so the public protection system user can view other sections of the apartment building. The public protection system, in turn, may relay information to fire personnel in transit as well as determine whether more fire trucks are required prior to the fire personnel arriving at the scene.

Figure 6:
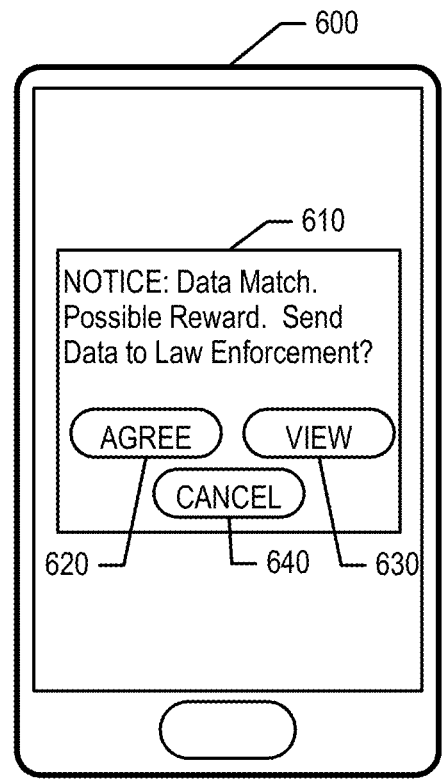
FIG. 6 is a diagram depicting an example of a user device displaying a request to upload matching data.

FIG. 6 is a diagram depicting an example of a user device displaying a request to upload matching data. In one embodiment, the public protection system determined that user device is within, or was within, an incident proximity area at the time of a previous incident. As such, the public protection system sends a request to user device 600, whereupon user device 600 analyzes stored images corresponding to a time and location of the past incident.

In one embodiment, the request may be a periodic request to search stored data (images, audio, video) for information that matches unsolved incidents. In this embodiment, the public protection system may send such requests to participating user devices regardless of whether the user devices were in proximity to the unsolved incidents. For example, a thief may steal a car in Texas but authorities believe that the thief drove the vehicle to Arizona. In this example, the public protection system may send data analysis requests to participating user devices that are located in Arizona.

When the application detects a data match, the application displays message 610 and provides the user with the option of sending the data (620), viewing or listening to the data (630) before sending the data, or canceling the data upload (640).

Figure 7:
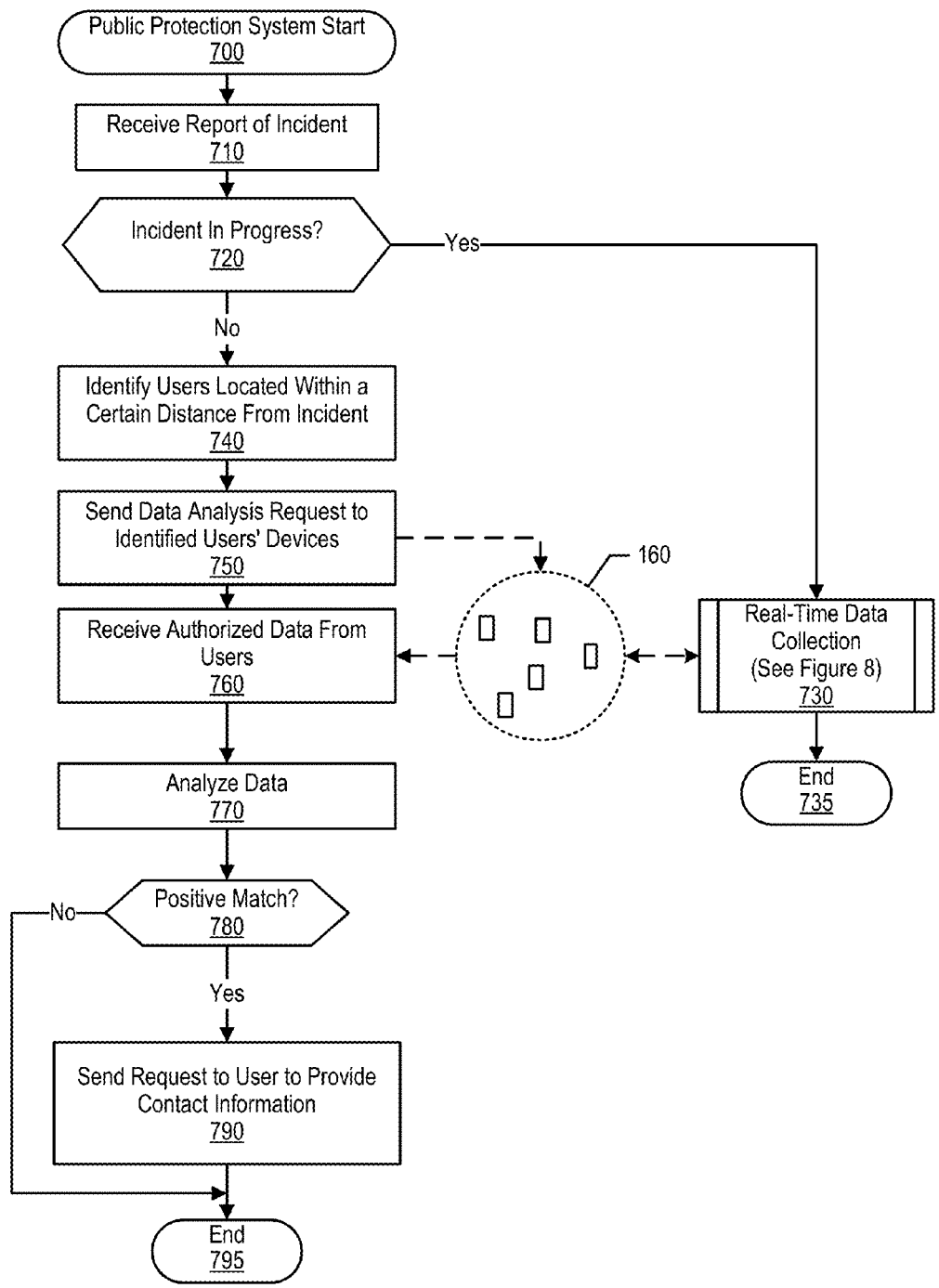
FIG. 7 is a flowchart depicting an example of steps taken by a public protection system that requests real-time data from identified user devices and analyzes the real-time data for evidence corresponding to an incident in progress.

FIG. 7 is a flowchart depicting an example of steps taken by a public protection system that requests real-time data from identified user devices and analyzes the real-time data for evidence corresponding to an incident in progress. Public protection system processing commences at 700, whereupon the public protection system receives a report of an incident at step 710, such as a crime, a fire, etc. In one embodiment, the public protection system may be a centralized call center (e.g., 911-call center) or the public protection system may support a specific agency, such as a police department, fire department, or EMS facility.

The public protection system determines whether the incident is in progress (decision 720). If the incident is in progress, decision 720 branches to the "Yes" branch, whereupon the public protection system sends requests to user devices within an incident proximity area of the incident and receives real-time data (pre-defined processing block 730, see FIG. 8 and corresponding text for further details). For example, a building may be on fire and the public protection system sends a request to a nearby pedestrian to video the fire and stream the video to the public protection system. Processing ends at 735.

On the other hand, if the incident has completed, decision 720 branches to the "No" branch. For example, a business owner may have discovered that a burglar vandalized his building the previous evening. At step 740, the public protection system determines an incident proximity area, such as 500 feet from the incident, and identifies user devices located within the incident proximity area at an approximate time frame of the incident.

At step 750, the public protection system sends a data analysis request to the identified user devices to analyze media stored on the user devices that was captured at the approximate time frame. The public protection system receives media data from the user devices, at step 760. The public protection system analyzes the data based upon the incident at step 770, and the public protection system determines whether the data includes evidence data (decision 780). For example, a thief may have stolen a car and an image may have captured the thief breaking into the car.

If the public protection system determines that the data includes evidence data, the public protection system, in one embodiment, sends a notification to the corresponding user device requesting the user of the user device to provide contact information (step 790). In this embodiment, the public protection system may provide the contact information to authorities that, in turn, may further question the user to obtain details of the incident. On the other hand, if the public protection system did not find evidence data, decision 780 branches to the "No" branch, and processing ends at 795.

Figure 8:
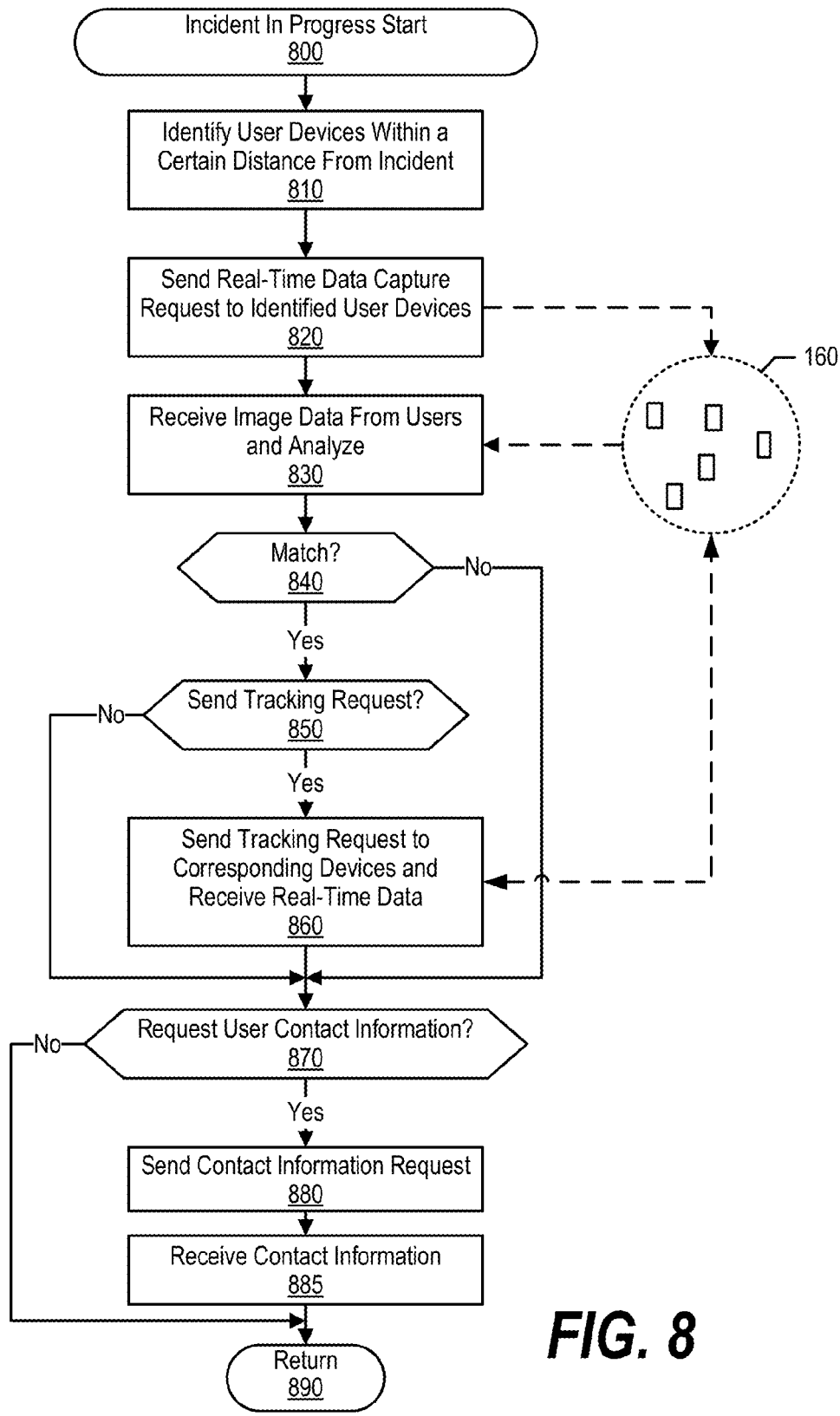
FIG. 8 is a flowchart depicting an example of steps taken by a public protection system that sends a real-time data collection request to user devices and receives real-time data from the user devices.

FIG. 8 is a flowchart depicting an example of steps taken by a public protection system that sends a real-time data collection request to user devices and receives real-time data from the user devices. Public protection system processing commences at 800, whereupon the public protection system identifies an incident proximity area, such as 500 feet from an incident in progress, and identifies user devices that are currently located within incident proximity area 160 (step 810).

At step 820, the public protection system sends a real-time data collection request to the proximate user devices. In one embodiment, the request may require the user to move locations, such as a request for the user to video a house on fire around a corner. In another embodiment, the request may indicate a monetary amount available to the user if the user agrees to cooperate with the real-time data collection request.

The public protection system receives real-time data from the user devices, which the public protection system analyzes at step 830. The public protection system determines whether the data includes evidence data, such as whether an image includes a black van parked outside the bank (decision 840). If the public protection system determines that the data does not include evidence data, decision 840 branches to the "No" branch.

On the other hand, if the public protection system determines that the data includes evidence data, a determination is made as to whether to send a tracking request to the user device that provided the matching real-time data (decision 850). For example, a user device may be videotaping a fire and the public protection system may request the user to pan in a particular direction (see FIG. 5 and corresponding text for further details). In another embodiment, a user device may have taken a picture of a black van leaving an incident in progress and the public protection system may request the user to video tape the van as it leaves the scene (see FIG. 4 and corresponding text for further details).

If the public protection system determines to send a tracking request, decision 850 branches to the "Yes" branch, whereupon the public protection system sends a tracking request to identified user devices and receives subsequent real-time data accordingly (step 860). The public protection system may periodically send additional tracking requests to the identified user devices based upon the current situation of the incident in progress. On the other hand, if the public protection system determines not to send a tracking request, decision 850 branches to the "No" branch, bypassing step 860.

The public protection system determines whether to request user contact information (decision 870). As discussed above, by obtaining user contact information, the public protection system may notify authorities that, in turn, may further question the user of the device. If the public protection system determines not to request user contact information, decision 870 branches to the "No" branch and processing ends at 890. On the other hand, if the public protection system wishes to obtain the user contact information, decision 870 branches to the "Yes" branch, whereupon the public protection system sends a contact information request to the user at 880. At step 885, the public protection system receives the user contact information after the user authorizes the user device to send the contact information, associates the user contact information with the matched real-time data, and processing returns at 890.

Figure 9:
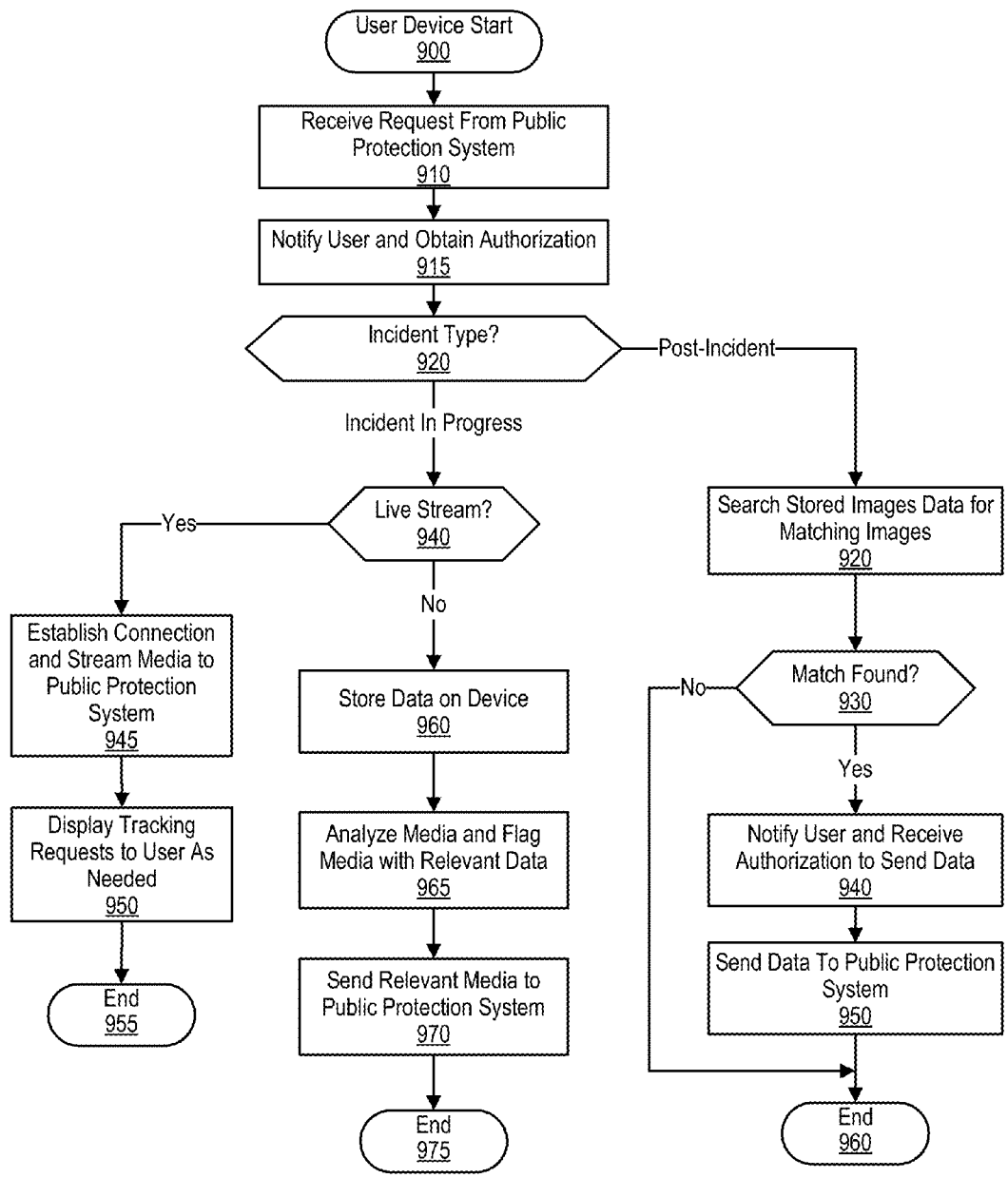
FIG. 9 is a flowchart depicting an example of steps taken by a user device that processes a request from a public protection system.

FIG. 9 is a flowchart depicting an example of steps taken by a user device that processes a request from a public protection system. Device processing commences at 900, whereupon the device receives a request from the public protection system at step 910. The request may include incident data such as the location of the incident, the type of incident, the time of the incident, etc. At step 915, the device displays a message to the user and obtains authorization to process the request. If the user does not authorize the request, device processing ends (not shown).

A determination is made as to whether the request corresponds to an incident in progress or a post-incident (decision 920). If the request pertains to a previous incident or unsolved incident, decision 920 branches to the "Post-incident" branch, whereupon a device application compares stored data against an incident database (step 920). A determination is made as to whether the device application matched stored data against the incident database (decision 930). If the device found a match, decision 930 branches to the "Yes" branch, whereupon the device notifies the user and receives authorization to send the matched media (step 940). Once the user provides authorization, the device sends the matched data to the public protection system (step 950). On the other hand, if a match was not found, decision 930 branches to the "No" branch and processing ends at 960.

Referring back to decision 920, if the request corresponds to an incident in progress, decision 920 branches to the "Incident In Progress" branch, whereupon a determination is made as to whether the request is to provide streaming media, such as a live video stream or a live audio stream (decision 940). If the public protection system requests a live stream, decision 940 branches to the "Yes" branch, whereupon the device establishes a connection with the public protection system and streams the media to the public protection system (step 945). In one embodiment, the device receives tracking requests, such as to pan a building or videotape a van traveling down a road. In this embodiment, the device displays tracking requests to the user as required and responds to the user's actions (step 950). Processing ends at 955.

Referring back to decision 940, if the public protection system does not request a live video feed, decision 940 branches to the "No" branch. At step 960, the device stores real-time data on the device. For example, the request may request a 10-minute period to take images every minute of an incident area. At step 965, in one embodiment, the device analyzes the images against the provided incident data and sends media determined to include evidence data to the public protection system (step 970). In another embodiment, the device sends the real-time data to the public protection system and the public protection system analyzes the real-time data for evidence data. Processing ends at 975.

Figure 10:
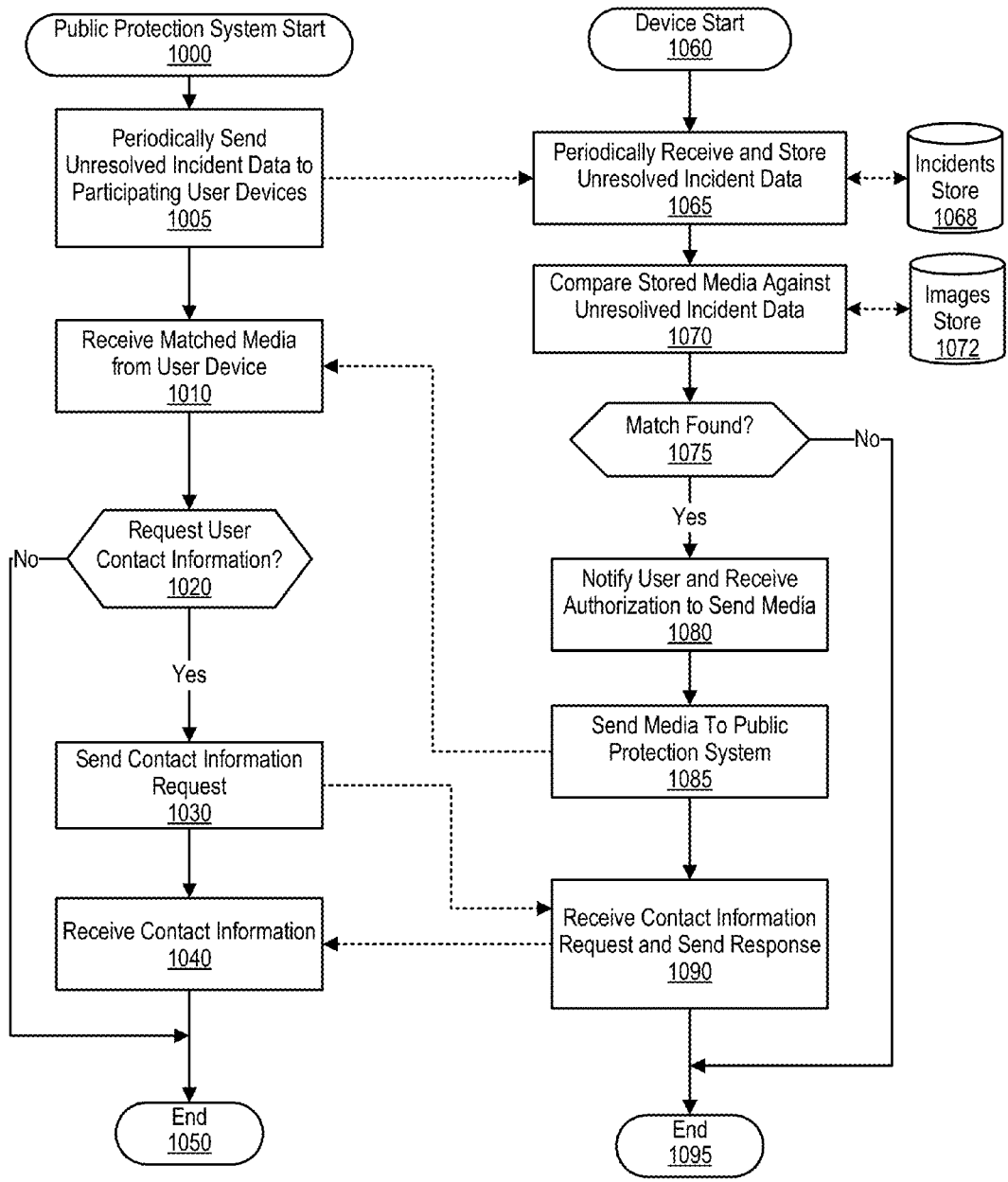
FIG. 10 is a flowchart depicting an example of steps taken by a user device to periodically receive unsolved incident data and determine whether stored images correspond to the unsolved incident data.

FIG. 10 is a flowchart depicting an example of steps taken by a user device to periodically receive unsolved incident data and determine whether stored images correspond to the unsolved incident data.

Processing commences at 1000, whereupon the public protection system periodically sends unsolved incident data to a participating user device at 1005. For example, the unsolved incident data may include license plate information of stolen vehicles over the past six months. In one embodiment, the public protection system sends the unsolved incident data to participating user devices on a recurring basis, such as once per week.

Device processing commences at 1060, whereupon the device receives the unsolved incident data and stores the unsolved incident data in incidents store 1068 (step 1065). At step 1070, the device compares the unsolved incident data with stored images in image store 1072. In one embodiment, the device identifies images to search based upon a time stamp. For example, if a vehicle was stolen on Mar. 1, 2014, the device searches images taken subsequent to Mar. 1, 2014. Continuing with this example, if the device has images taken on Mar. 1, 2014 that have GPS coordinates in proximity to the location of where the vehicle was stolen, the device may perform an added layer of analysis on the image or mark the image to send to the public protection system for further analysis.

Processing determines whether the device identified stored data that match the unsolved incident data (decision 1075). If the device did not identify a match, decision 1075 branches to the "No" branch, whereupon processing ends at 1095. On the other hand, if the device identified a match, decision 1075 branches to the "Yes" branch, whereupon the device notifies the user and receives user authorization at step 1080 to send the data (see FIG. 6 and corresponding text for further details). At step 1085, the device sends the images to the public protection system.

Returning to the public protection system processing, the public protection system receives the images at step 1010, and the public protection system determines whether to request contact information from the user for further questioning (decision 1020). For example, an image may include substantial evidence data and a law enforcement representative may wish to ask the user further questions. If the public protection system would like contact information, decision 1020 branches to the "Yes" branch, whereupon the public protection system sends a request for contact information at step 1030.

The device receives the request at step 1090, obtains authorization from the user to send the user's contact information, and the device sends the user's contact information to the public protection system accordingly, such as the user's name and phone number. Device processing ends at 1095. The public protection system receives the user's contact information at step 1040, and public protection system processing ends at 1050.

Figure 11:
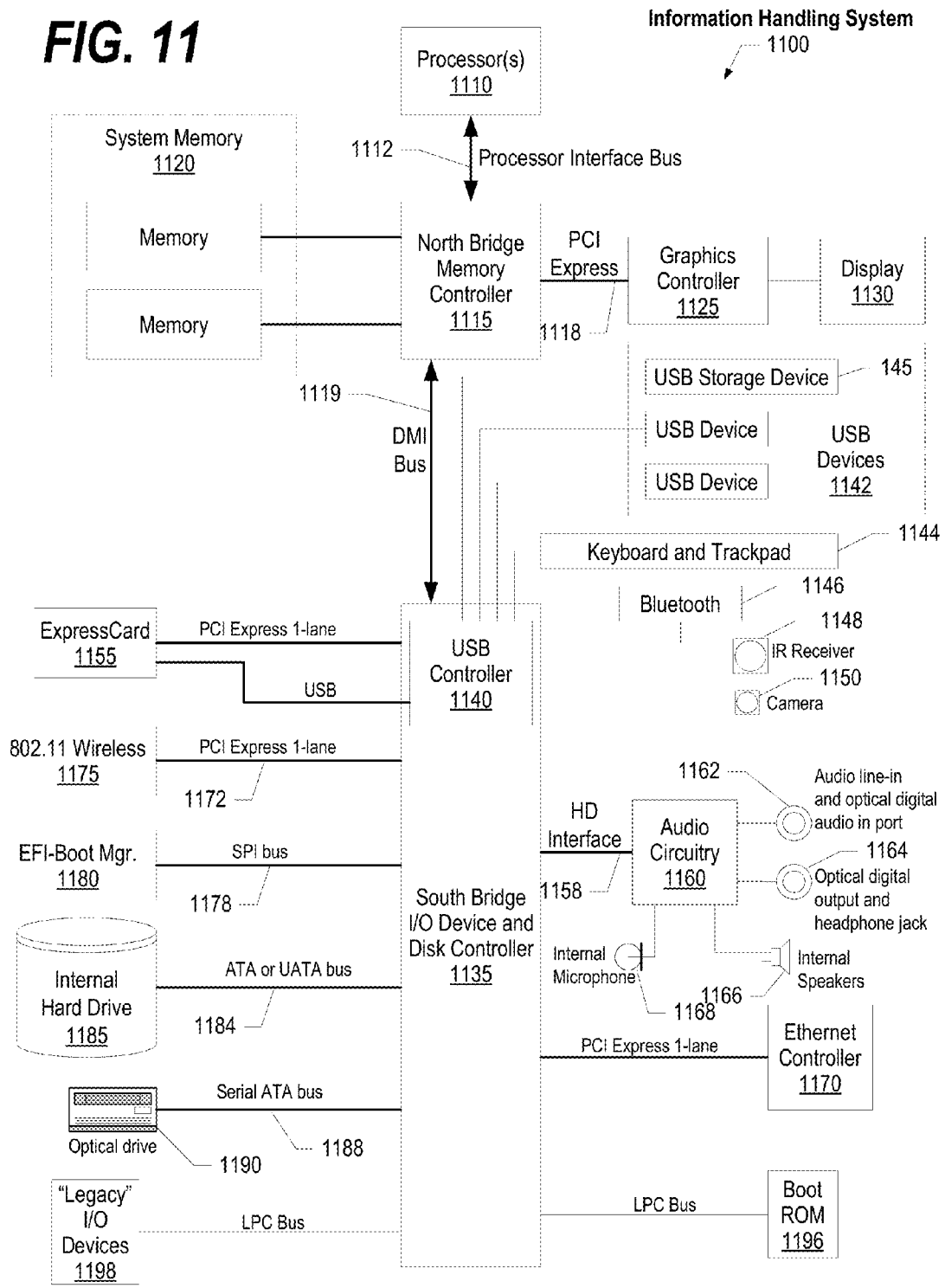
FIG. 11 is a block diagram depicting an example of a data processing system in which the methods described herein can be implemented.

FIG. 11 illustrates information handling system 1100, which is a simplified example of a computer system capable of performing the computing operations described herein.

Information handling system 1100 includes one or more processors 1110 coupled to processor interface bus 1112.

Processor interface bus 1112 connects processors 1110 to Northbridge 1115, which is also known as the Memory Controller Hub (MCH). Northbridge 1115 connects to system memory 1120 and provides a means for processor(s) 1110 to access the system memory. Graphics controller 1125 also connects to Northbridge 1115. In one embodiment, PCI Express bus 1118 connects Northbridge 1115 to graphics controller 1125. Graphics controller 1125 connects to display device 1130, such as a computer monitor.

Northbridge 1115 and Southbridge 1135 connect to each other using bus 1119. In one embodiment, the bus is a Direct Media Interface (DMI) bus that transfers data at high speeds in each direction between Northbridge 1115 and Southbridge 1135. In another embodiment, a Peripheral Component Interconnect (PCI) bus connects the Northbridge and the Southbridge. Southbridge 1135, also known as the I/O Controller Hub (ICH) is a chip that generally implements capabilities that operate at slower speeds than the capabilities provided by the Northbridge. Southbridge 1135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1196 and "legacy" I/O devices (using a "super I/O" chip). The "legacy" I/O devices (1198) can include, for example, serial and parallel ports, keyboard, mouse, and/or a floppy disk controller. The LPC bus also connects Southbridge 1135 to Trusted Platform Module (TPM) 1195. Other components often included in Southbridge 1135 include a Direct Memory Access (DMA) controller, a Programmable Interrupt Controller (PIC), and a storage device controller, which connects Southbridge 1135 to nonvolatile storage device 1185, such as a hard disk drive, using bus 1184.

ExpressCard 1155 is a slot that connects hot-pluggable devices to the information handling system. ExpressCard 1155 supports both PCI Express and USB connectivity as it connects to Southbridge 1135 using both the Universal Serial Bus (USB) the PCI Express bus. Southbridge 1135 includes USB Controller 1140 that provides USB connectivity to devices that connect to the USB. These devices include webcam (camera) 1150, infrared (IR) receiver 1148, keyboard and trackpad 1144, and Bluetooth device 1146, which provides for wireless personal area networks (PANs). USB Controller 1140 also provides USB connectivity to other miscellaneous USB connected devices 1142, such as a mouse, removable nonvolatile storage device 1145, modems, network cards, ISDN connectors, fax, printers, USB hubs, and many other types of USB connected devices. While removable nonvolatile storage device 1145 is shown as a USB-connected device, removable nonvolatile storage device 1145 could be connected using a different interface, such as a Firewire interface, etcetera.

Wireless Local Area Network (LAN) device 1175 connects to Southbridge 1135 via the PCI or PCI Express bus 1172. LAN device 1175 typically implements one of the IEEE 802.11 standards of over-the-air modulation techniques that all use the same protocol to wireless communicate between information handling system 1100 and another computer system or device. Optical storage device 1190 connects to Southbridge 1135 using Serial ATA (SATA) bus 1188. Serial ATA adapters and devices communicate over a high-speed serial link. The Serial ATA bus also connects Southbridge 1135 to other forms of storage devices, such as hard disk drives. Audio circuitry 1160, such as a sound card, connects to Southbridge 1135 via bus 1158. Audio circuitry 1160 also provides functionality such as audio line-in and optical digital audio in port 1162, optical digital output and headphone jack 1164, internal speakers 1166, and internal microphone 1168. Ethernet controller 1170 connects to Southbridge 1135 using a bus, such as the PCI or PCI Express bus. Ethernet controller 1170 connects information handling system 1100 to a computer network, such as a Local Area Network (LAN), the Internet, and other public and private computer networks.

While FIG. 11 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 12:
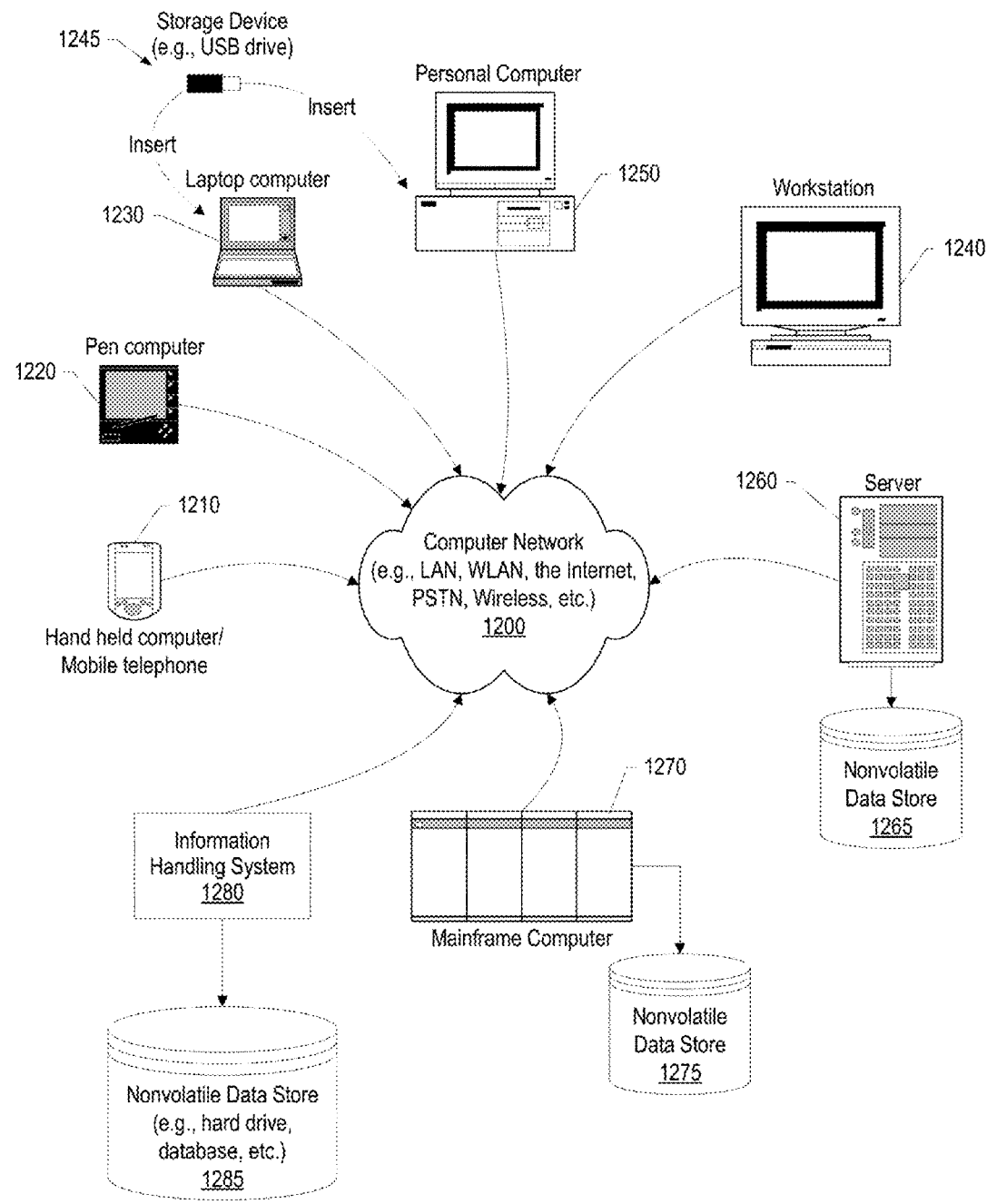
FIG. 12 provides an extension of the information handling system environment shown in FIG. 11 to illustrate that the methods described herein can be performed on a wide variety of information handling systems which operate in a networked environment.

FIG. 12 provides an extension of the information handling system environment shown in FIG. 11 to illustrate that the methods described herein can be performed on a wide variety of information handling systems that operate in a networked environment. Types of information handling systems range from small handheld devices, such as handheld computer/mobile telephone 1210 to large mainframe systems, such as mainframe computer 1270. Examples of handheld computer 1210 include personal digital assistants (PDAs), personal entertainment devices, such as MP3 players, portable televisions, and compact disc players. Other examples of information handling systems include pen, or tablet, computer 1220, laptop, or notebook, computer 1230, workstation 1240, personal computer system 1250, and server 1260. Other types of information handling systems that are not individually shown in FIG. 12 are represented by information handling system 1280. As shown, the various information handling systems can be networked together using computer network 1200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 12 depicts separate nonvolatile data stores (server 1260 utilizes nonvolatile data store 1265, mainframe computer 1270 utilizes nonvolatile data store 1275, and information handling system 1280 utilizes nonvolatile data store 1285). The nonvolatile data store can be a component that is external to the various information handling systems or can be internal to one of the information handling systems. In addition, removable nonvolatile storage device 1145 can be shared among two or more information handling systems using various techniques, such as connecting the removable nonvolatile storage device 1145 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

sending a data collection request from the information handling system to one or more user devices located within a geographical proximity of an incident in progress, wherein the data collection request is sent prior to receiving information pertaining to the incident in progress from at least one of the one or more user devices, and wherein each of the one or more user devices is instructed to capture real-time data corresponding to the incident in progress;

receiving, at the information handling system, the real-time data captured by the one or more user devices that includes evidence data corresponding to the incident in progress;

sending a tracking request, based on analyzing the evidence data, from the information handling system to one or more different user devices that are not part of the one or more user devices, wherein the tracking request corresponds to a different location than a location of the incident in progress;

receiving, at the information handling system, subsequent real-time data from at least one of the one or more different user devices; and providing, by the information handling system, the subsequent real-time data to one or more public service users.

2. The method of claim 1 wherein the real-time data is selected from the group consisting of still image data, video data, and audio data.

3. The method of claim 1 further comprising:

identifying a first one of the one more devices that provided the evidence data;

sending a request to the first device to provide user contact information of a user of the first device;

receiving the user contact information from the first device; and linking the user contact information to the evidence data.

4. The method of claim 3 further comprising:

sending a reward notification to the first device in response to the first device providing the evidence data.

5. The method of claim 1 wherein the tracking request is a request to provide a live video stream.

6. The method of claim 1 further comprising:

providing unsolved incident data to one or more participating user devices, wherein the unsolved incident data includes information corresponding to one or more unsolved incidents; and receiving, from a first one of the one or more participating user devices, post-incident data matched to the unsolved incident data, wherein the post-incident data was captured subsequent to a corresponding one of the one or more unsolved incidents.

7. The method of claim 6 wherein each of the one or more participating devices provided a user agreement to receive the unsolved incident data.

* * * * *